United States Patent [19]
Mitra et al.

[11] Patent Number: 6,167,472
[45] Date of Patent: Dec. 26, 2000

[54] SYSTEM FOR COMMUNICATING WITH AND INITIALIZING A COMPUTER PERIPHERAL UTILIZING A MASKED VALUE GENERATED BY EXCLUSIVE-OR OF DATA AND CORRESPONDING MASK

[75] Inventors: Rajat K. Mitra, Mansfield, Mass.; Christopher Tann, San Jose, Calif.

[73] Assignee: Motorola Inc., Schaumburg, Ill.

[21] Appl. No.: 09/087,302

[22] Filed: May 29, 1998

[51] Int. Cl.[7] ............................ G06F 13/14; G06F 13/16; G06F 13/20

[52] U.S. Cl. ................................ 710/65; 710/49; 710/73; 710/126; 711/119; 712/36; 709/400

[58] Field of Search ..................................... 710/1, 65, 73, 710/49, 126; 711/119; 364/200; 712/36, 1; 380/25; 340/825.39; 371/37.53; 395/446; 709/400

[56] References Cited

U.S. PATENT DOCUMENTS

| | | | |
|---|---|---|---|
| 5,386,469 | 1/1995 | Yearsley et al. | 380/3 |
| 5,410,660 | 4/1995 | Divine et al. | 395/375 |
| 5,815,723 | 9/1998 | Wilkinson et al. | 395/800.2 |
| 5,862,160 | 1/1999 | Irvin et al. | 371/53 |
| 5,890,006 | 3/1999 | Tran et al. | 395/800.01 |

*Primary Examiner*—Thomas C. Lee
*Assistant Examiner*—Rehana Perveen
*Attorney, Agent, or Firm*—Joanne N. Pappas; Jeffrey T. Klayman

[57] ABSTRACT

A system, device, and method allowing a host device to communicate with, and initialize, an uninitialized peripheral device includes, on the peripheral device, logic for storing a separate mask corresponding to each of a plurality of memory locations, and logic, responsive to a request for reading a memory location, for outputting a bit-wise exclusive-OR of data stored in the memory location and the corresponding mask. The mask is equal to a bit-wise exclusive-OR of a predetermined configuration value and a preset value. Thus, if the memory location is not preprogrammed with configuration information, the bit-wise exclusive-OR of the data stored in the memory location and the corresponding mask results in a valid default configuration value. Once the host device is able to communicate with the peripheral device, the host device programs the peripheral device by storing in the memory location a new data value equal to the bit-wise exclusive-OR of a new configuration value and the corresponding mask.

46 Claims, 6 Drawing Sheets

SYSTEM FOR COMMUNICATING WITH AND INITIALIZING A COMPUTER PERIPHERAL UTILIZING A MASKED VALUE GENERATED BY EXCLUSIVE-OR OF DATA AND CORRESPONDING MASK

BACKGROUND

1. Field of the Invention

The invention relates generally to communication systems, and more particularly to communicating with and initializing an uninitialized computer peripheral device.

2. Discussion of Related Art

In a typical computer system such as a personal computer or workstation, various peripheral devices are used to provide input/output capabilities for the computer system. For example, a typical computer system includes peripheral devices such as a disk drive, a CD-ROM drive, audio/video/graphics controllers, a local area network adapter, and a modem. Architecturally, the peripheral devices are interconnected with a central processing unit (CPU) and memory in the computer system by means of a peripheral bus.

One type of peripheral bus in widespread use is the Peripheral Component Interconnect (PCI) bus. PCI is a standardized bus architecture that permits very high speed burst transfers to and from the peripheral devices. Each peripheral device on the PCI bus, referred to as a "PCI peripheral device," supports and participates in the PCI bus protocol. During startup of the computer system, each PCI peripheral device is identified and assigned any computer system resources that it requires.

In order to be identified during computer system startup, each PCI peripheral device is capable of reporting certain information (hereinafter referred to as "configuration information") which identifies the PCI peripheral device and indicates the computer system resources required by the PCI peripheral device. Therefore, a typical PCI peripheral device includes either hard-coded logic or a programmable non-volatile memory for storing configuration information. Where hard-coded logic is used for storing configuration information, the configuration information cannot be changed once the configuration information is hard-coded in the logic. Where a programmable non-volatile memory is used for storing configuration information, the configuration information must be pre-programmed before the PCI peripheral device can operate on the PCI bus, although the configuration information can be subsequently changed if necessary by re-programming the programmable non-volatile memory. This latter approach is preferred over the hard-coded approach due to the ability to change the configuration information if necessary, for example, due to a software or hardware upgrade of the PCI peripheral device. However, the step of pre-programming the programmable non-volatile memory is an additional step taken prior to installation of the PCI peripheral device, typically during manufacturing of the PCI peripheral device, and therefore adds a certain cost to the PCI peripheral device. A PCI peripheral device that is programmable but also requires no pre-programming is desirable.

Detailed Description

Figure 1:
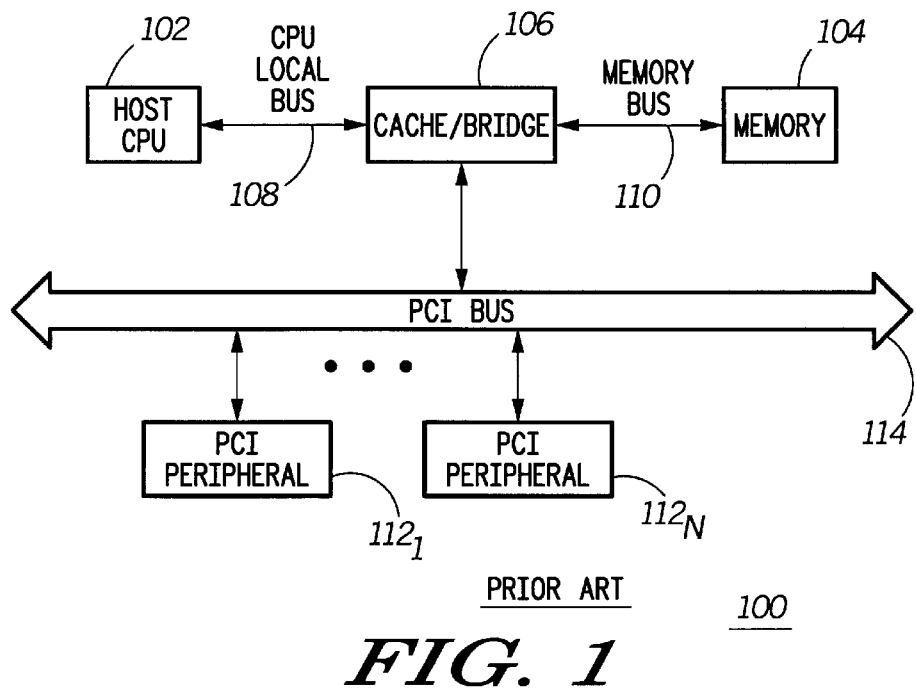
FIG. 1 shows a diagram of an exemplary computer system 100 such as a personal computer or workstation as is known in the art.

FIG. 1 shows an exemplary computer system 100 such as a personal computer or workstation as is known in the art. As shown in FIG. 1, the computer system 100 includes a Host Central Processing Unit (CPU) 102, predominantly for executing software programs that control the operation of the computer system 100. The computer system 100 also includes a number of PCI Peripherals $112_1$ through $112_N$ (referred to collectively as "PCI Peripherals 112" and individually as a "PCI Peripheral 112") for providing various input/output capabilities for the computer system 100. The computer system 100 further includes a Memory 104 for storing the software programs executed by the Host CPU 102, and also for storing data used by the Host CPU 102 and the PCI Peripherals 112.

The Host CPU 102, the Memory 104, and the PCI Peripherals 112 have different interface requirements. Therefore, in order to allow the Host CPU 102, the Memory 104, and the Peripherals 112 to interface with each other, the computer system 100 also includes a Cache/Bridge 106. The Cache/Bridge 106 is coupled to the Host CPU 102 by means of a CPU Local Bus 108, to the Memory 104 by means of a Memory Bus 110, and to the PCI Peripherals 112 by means of a PCI Bus 114. The Cache/Bridge 106 coordinates transfers of information between the Host CPU 102, the Memory 104, and the PCI Peripherals 112.

Before a PCI Peripheral 112 can operate within the computer system 100, the PCI Peripheral 112 must be allocated any system resources that it requires such as a base address, memory, and interrupts. Therefore, during startup of the computer system 100, the Host CPU 102 executes configuration software that is stored in the Memory 104. The configuration software scans the PCI Bus 114 and reads configuration information from each PCI Peripheral 112. The configuration information typically includes parameters for indicating a vendor identification number, a device identification number, a device serial number, device interrupt requirements, base address register requirements, memory requirements, and device capabilities. The configuration information identifies the PCI Peripheral 112 and indicates to the configuration software the system requirements and capabilities of the PCI Peripheral 112.

After receiving configuration information from each PCI Peripheral 112, the configuration software allocates base address, memory, and interrupt resources to the PCI Peripherals 112 based on the system requirements of each PCI Peripheral 112. The PCI Peripherals 112 are then able to operate within the computer system 100.

Figure 2:
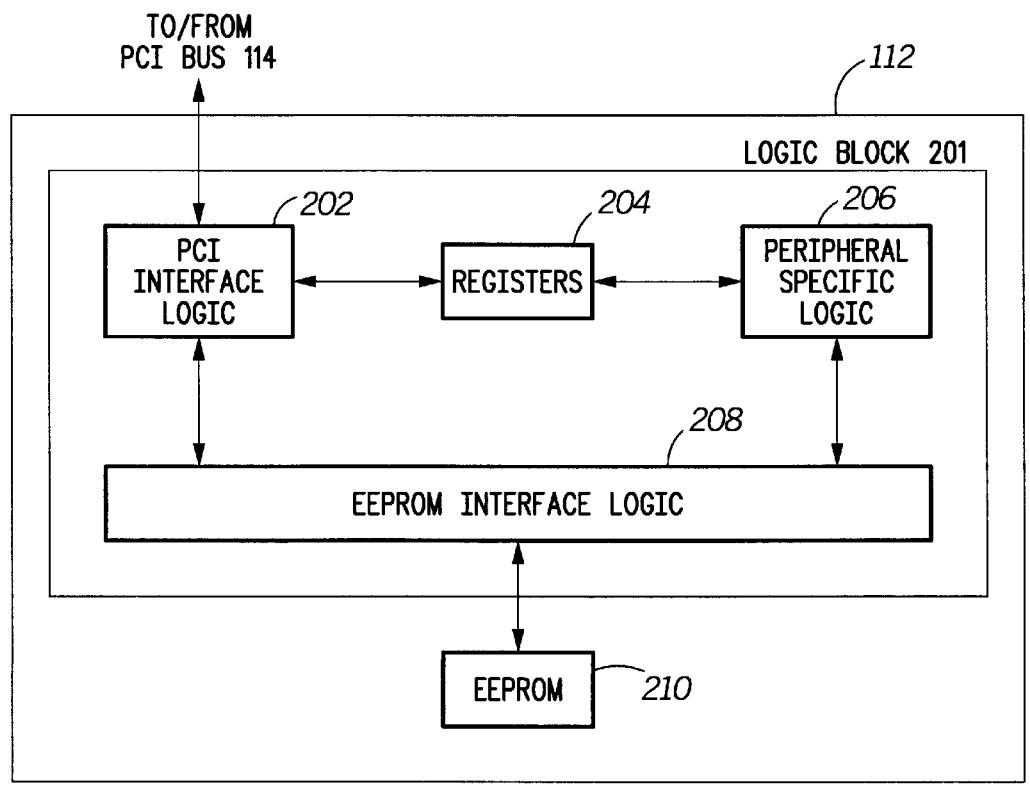
FIG. 2 shows a block diagram of an exemplary PCI Peripheral 112 as is known in the art.

FIG. 2 shows a typical PCI Peripheral 112 as is known in the art. As shown in FIG. 2, the PCI Peripheral 112 includes a logic block 201 that includes substantially all of the logic for performing the specific functions of the PCI Peripheral 112. Logic block 201 is typically embodied in an Application Specific Integrated Circuit (ASIC), a Field Programmable Gate Array (FPGA), or a microprocessor responsive through a set of program instructions stored in an associated memory. The PCI Peripheral 112 also includes a serial electronically erasable programmable read-only memory (EEPROM) 210 or other programmable non-volatile memory for storing configuration information and other data. The logic block 201 is coupled to the EEPROM 210 through an interface that allows the logic block 201 to read data from, and write data into, the EEPROM 210.

The logic block 201 includes PCI Interface Logic 202 that is coupled to the PCI Bus 114 to provide a PCI-compliant interface to the PCI Peripheral 112. The logic block 201 also includes Peripheral Specific Logic 206 for implementing specific device functions such as network interface functions for a network interface adapter, or modem functions for a modem. PCI Interface Logic 202 and Peripheral Specific Logic 206 are coupled to, and interface through, Registers 204. The logic block 201 further includes EEPROM Interface Logic 208 coupled to the EEPROM 210 and to both the PCI Interface Logic 202 and the Peripheral Specific Logic 206. EEPROM Interface Logic 208 allows the PCI Interface Logic 202 and the Peripheral Specific Logic 206 to interface with the EEPROM 210. Specifically, the EEPROM Interface Logic 208 allows the PCI Interface Logic 202 and the Peripheral Specific Logic 206 to read configuration information and other data from the EEPROM 210 and to write configuration information and other data into the EEPROM 210.

In the PCI Peripheral 112, the PCI Interface Logic 202 obtains configuration information during computer system startup by reading corresponding memory locations in the EEPROM 210. If the corresponding memory locations have not been programmed with valid configuration information values prior to startup, then the corresponding memory locations will contain preset values that, in a typical programmable non-volatile memory such as EEPROM 210, are equal to all ones. Thus, the configuration information read from the EEPROM 210 and sent to the configuration software will be equal to all ones. Configuration information comprising all ones is invalid, and therefore the configuration software will be unable to identify the PCI Peripheral 112 and will be unable to allocate system resources to the PCI Peripheral 112. Consequently, the EEPROM 210 must be pre-programmed with configuration information before the PCI Peripheral 112 can function within the computer system 100.

As discussed above, a need remains for a PCI peripheral device that is programmable but also requires no pre-programming before the PCI peripheral device can operate within the computer system. The present invention includes a PCI peripheral device that reports default configuration information if it has not been pre-programmed with configuration information. The default configuration information allows the PCI peripheral device to operate within the computer system, at least to the extent that the configuration software is able to identify the PCI peripheral device. Once the PCI peripheral device is able to operate in the computer system, the configuration software (or other software) is able to program the PCI peripheral device with new configuration information.

A PCI peripheral device in accordance with the present invention includes both hard-coded logic and a programmable non-volatile memory. Each memory location in the programmable non-volatile memory is associated with a corresponding mask stored in the hard-coded logic. When an attempt is made to read a particular memory location of the programmable non-volatile memory, logic on the PCI peripheral device outputs a masked value rather than outputting the actual (unmasked) value stored in the memory location. The masked value is equal to a bit-wise exclusive-OR of the actual value stored in the memory location and the corresponding mask stored in the hard-coded logic. Each mask is selected such that, if the value read from the corresponding memory location is the all ones value, the resulting masked value will be equal to a predetermined default configuration information value. Thus, in a preferred embodiment of the present invention, the PCI peripheral device requires no pre-programming in order to operate within the computer system.

Once the configuration software is able to communicate with the PCI peripheral device using the default configuration information, the configuration software (or other software) can modify the configuration information if necessary. In order to change a particular configuration information value to a new configuration information value, the software stores a new data value in the corresponding memory location in the programmable non-volatile memory on the PCI peripheral device. The new data value is selected so that the masked value that is output by the PCI peripheral device is equal to the new configuration information value. Therefore, the new data value is equal to the bit-wise exclusive-OR of the new configuration information value and the corresponding mask. The software uses standard PCI-defined data transfer mechanisms to write the new data value into the memory location. Thus, a preferred embodiment of the present invention provides means for re-programming configuration information.

Figure 3:
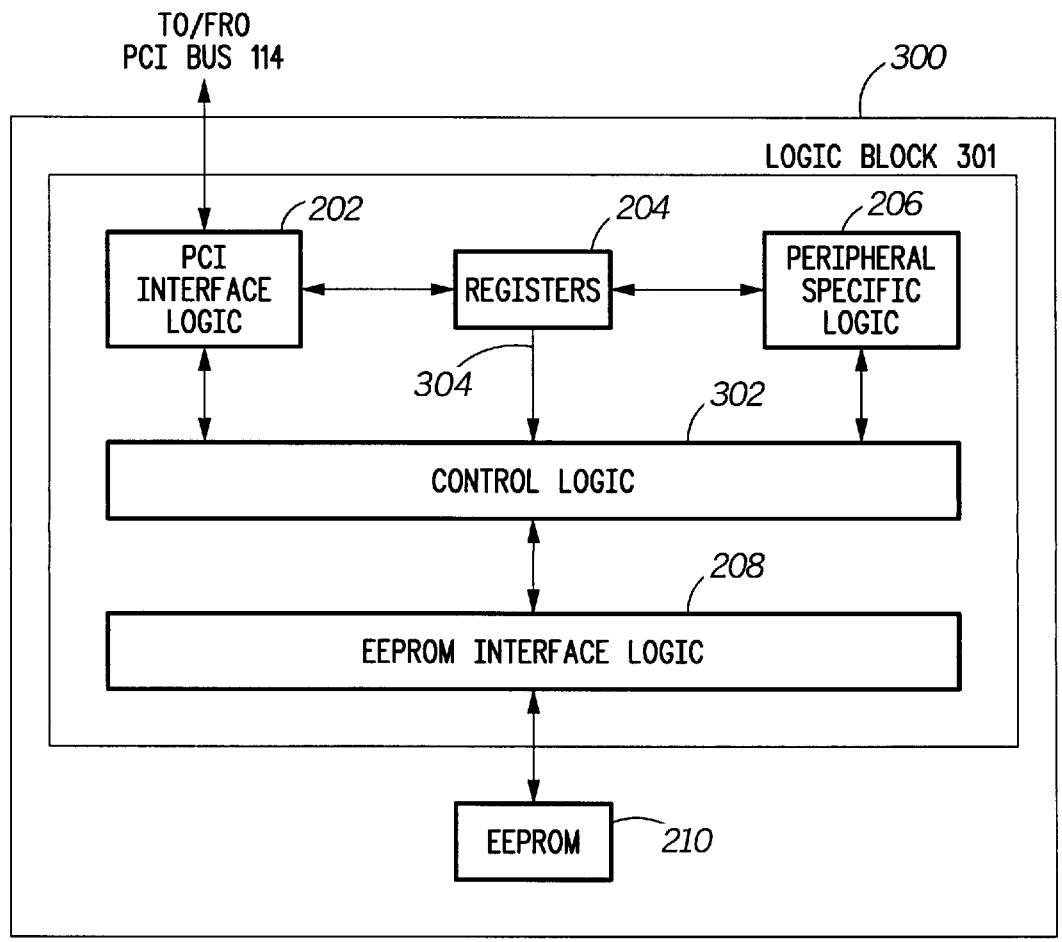
FIG. 3 shows a block diagram of a preferred embodiment of a PCI Peripheral 300 in accordance with the present invention.

FIG. 3 shows an exemplary embodiment of a preferred PCI Peripheral 300 in accordance with the present invention. The PCI Peripheral 300 includes a logic block 301 that includes substantially all of the logic for performing the specific functions of the PCI Peripheral 300. Logic block 301 is preferrably embodied in an Application Specific Integrated Circuit (ASIC), although the logic block 301 may also be embodied in a Field Programmable Gate Array (FPGA) or a microprocessor responsive through a set of program instructions stored in an associated memory. The PCI Peripheral 300 also includes the serial electronically erasable programmable read-only memory (EEPROM) 210 or other programmable non-volatile memory for storing configuration information and other data. The logic block 301 is coupled to the EEPROM 210 through an interface that allows the logic block 301 to read data from, and write data into, the EEPROM 210.

The logic block 301 includes PCI Interface Logic 202 that is coupled to the PCI Bus 114 for providing a PCI-compliant interface for the PCI Peripheral 300. The logic block 301 also includes Peripheral Specific Logic 206 for implementing specific device functions such as network interface functions for a network interface adapter or modem functions for a modem. PCI Interface Logic 202 and Peripheral Specific Logic 206 are coupled to, and interface through, Registers 204. The logic block 301 further includes EEPROM Interface Logic 208 that allows the logic block 301 to interface with the EEPROM 210. The PCI Interface Logic 202, the Peripheral Specific Logic 206, the Registers 204, and the EEPROM Interface Logic 208 in the preferred logic block 301 are substantially identical to the corresponding logic in the prior art logic block 201 shown in FIG. 2.

Continuing to refer to FIG. 3, the logic block 301 includes Control Logic 302 for outputting masked values as described above. The Control Logic 302 (described in greater detail with respect to FIG. 4 below) is coupled between the PCI Interface Logic 202 and the Peripheral Specific Logic 206 on the one hand and the EEPROM Interface Logic 208 on the other hand. The Control Logic 302 intercepts each attempt by the PCI Interface Logic 202 or the Peripheral Specific Logic 206 to read a memory location in the EEPROM 210. The Control Logic 302 obtains the actual value stored in the memory location by means of the EEPROM Interface Logic 208. The Control Logic 302 then outputs to the PCI Interface Logic 202 or the Peripheral Specific Logic 206 either the actual value or a masked value according to the state of an ACCESS_MODE signal 304 received from the Registers 204. Where the ACCESS_MODE signal 304 selects a masked value (which is the default selection), the Control Logic 302 outputs a masked value equal to a bit-wise exclusive-OR of the actual value and the corresponding mask hard-coded in the Control Logic 302.

Figure 4:
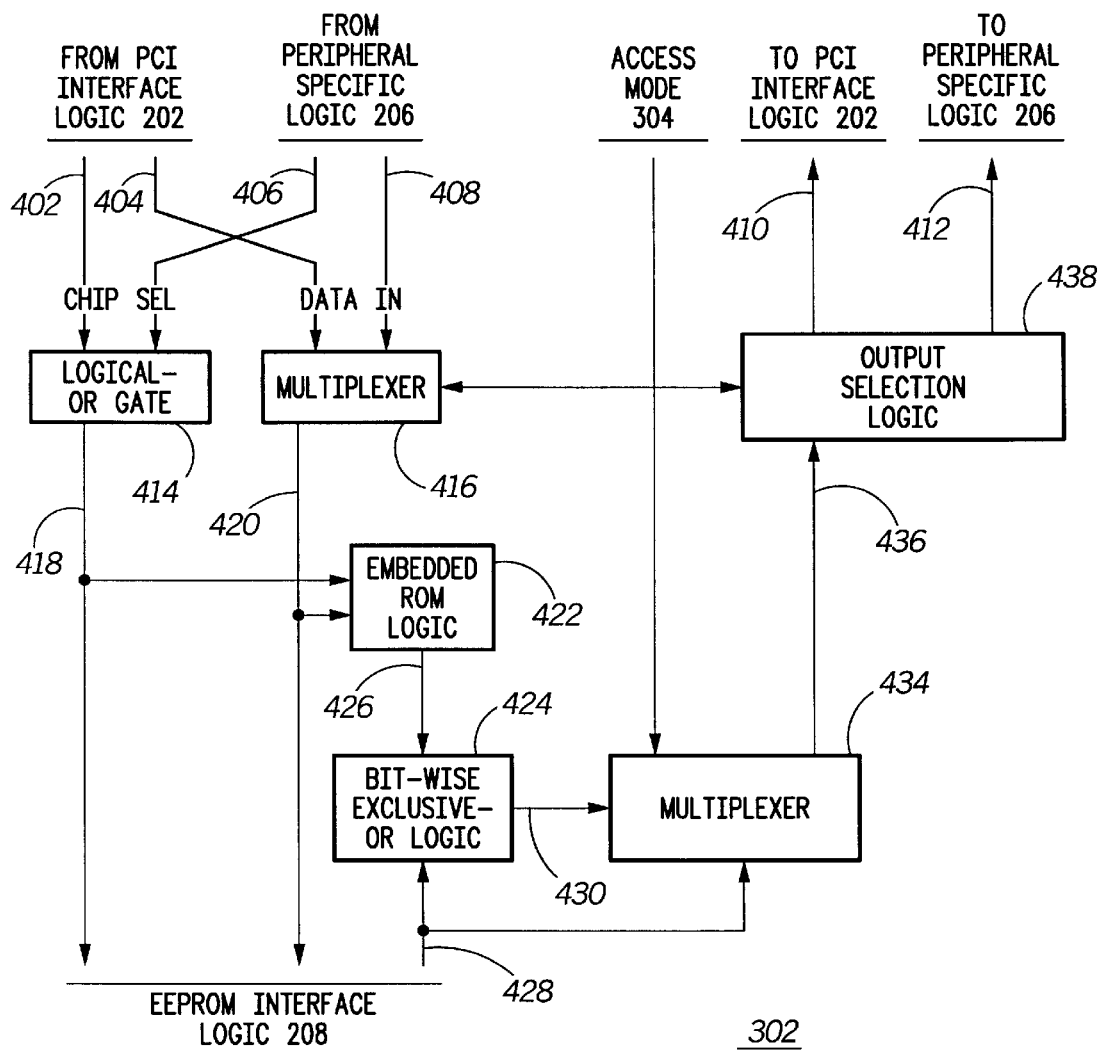
FIG. 4 shows a diagram of a preferred embodiment of Control Logic 302 in accordance with the present invention.

FIG. 4 shows a preferred embodiment of Control Logic 302. In the preferred embodiment, the Control Logic 302 is configured so that the PCI Interface Logic 202 receives masked values and the Peripheral Specific Logic 206 receives unmasked values. The PCI Interface Logic 202 always receives masked values because the PCI Interface Logic 202 must be able to provide the configuration information whether or not the EEPROM 210 has been preprogrammed. The Peripheral Specific Logic 206 receives unmasked values because the Peripheral Specific Logic 206 uses the EEPROM 210 for storing application-specific data, and generally does not need to access the configuration information.

As shown in FIG. 4, the Control Logic 302 interfaces with the PCI Interface Logic 202 by means of three signals. The Control Logic 302 is operably coupled to receive, as inputs from the PCI Interface Logic 202, a chip select input signal (CHIP SEL) 402 and a data input signal (DATA IN) 404. When the PCI Interface Logic 202 needs to access the EEPROM 210, for example, to read or write data, the PCI Interface Logic 202 asserts the chip select input signal 402 by driving the chip select input signal 402 to a logic level one, and sends commands on the data input signal 404. The Control Logic 302 outputs data to the PCI Interface Logic 202 over a data output signal 410.

Similarly, the Control Logic 302 interfaces with the Peripheral Specific Logic 206 by means of three signals. The Control Logic 302 is operably coupled to receive, as inputs from the Peripheral Specific Logic 206, a chip select input signal (CHIP SEL) 406 and a data input signal (DATA IN) 408. When the Peripheral Specific Logic 206 needs to access the EEPROM 210, for example, to read or write data, the Peripheral Specific Logic 206 asserts the chip select input signal 406 by driving the chip select input signal 406 to a logic level one, and sends commands on the data input signal 408. The Control Logic 302 outputs data to the Peripheral Specific Logic 206 over a data output signal 412.

Chip select input signals 402 and 406 are routed as inputs to a Logical-OR Gate 414, which outputs, as chip select signal 418, the logical-OR of chip select input signals 402 and 406. Thus, chip select signal 418 is asserted if either of the chip select input signals 402 and 406 is asserted. Chip select signal 418 is routed to both the EEPROM Interface Logic 208 and to Embedded ROM Logic 422.

Data input signals 404 and 408 are routed to the data inputs of a Multiplexer 416. The Multiplexer 416 also receives as an input the ACCESS_MODE signal 304 from the Registers 204. Multiplexer 416 outputs, as output data signal 420, one of the data input signals 404 and 408 based on the state of the ACCESS_MODE signal 304. Specifically, Multiplexer 416 outputs the data input signal 404 if the ACCESS_MODE signal 304 is at logic level zero (which is the default logic level), and outputs the data input signal 408 if the ACCESS_MODE signal 304 is at logic level one. Thus, in the preferred embodiment, ACCESS_MODE signal 304 determines whether the PCI Interface Logic 202 or the Peripheral Specific Logic 206 has access to the EEPROM 210. Data signal 420 is routed to both the EEPROM Interface Logic 208 and to Embedded ROM Logic 422.

Embedded ROM Logic 422 (described in greater detail with respect to FIG. 5 below) is operably coupled to receive the chip select signal 418 and the data signal 420. The Embedded ROM Logic 422 includes, among other things, the hard-coded logic for storing the masks. When the chip select signal 418 is asserted, the Embedded ROM Logic 422 mimics the functions of the EEPROM 210 by decoding commands on the data signal 420. If the command is for reading a particular memory location in the EEPROM 210, the Embedded ROM Logic 422 outputs the corresponding mask on signal 426 in synchronization with the data output by the EEPROM Interface Logic 208 on signal 428. If the command is not for reading a particular memory location in the EEPROM 210, then Embedded ROM Logic 422 ignores the command.

Signals 426 and 428 are routed as inputs to Bit-Wise Exclusive-OR Logic 424, which outputs, as signal 430, the bit-wise exclusive-OR of the signals 426 and 428. Signals 430 and 428 are routed to the data inputs of a Multiplexer 434. The Multiplexer 434 also receives the ACCESS_MODE signal 304 as an input from the Registers 204. Multiplexer 434 outputs, as output data signal 436, one of the signals 430 and 428 based on the state of the ACCESS_MODE signal 304. Specifically, Multiplexer 434 outputs the signal 430 if the ACCESS_MODE signal 304 is at logic level zero (which is the default logic level), and outputs the signal 428 if the ACCESS_MODE signal 304 is at logic level one. Thus, in the preferred embodiment, ACCESS_MODE signal 304 determines whether the Multiplexer 434 outputs the actual data value from the EEPROM 210 or the masked value.

Signal 436 from Multiplexer 434 is routed as an input to Output Selection Logic 438. The Output Selection Logic 438 (described in greater detail with respect to FIG. 6 below) also receives the ACCESS_MODE signal 304 as an input from the Registers 204. If the ACCESS_MODE signal 304 is at logic level zero (which is the default logic level), the Output Selection Logic 438 routes the signal 436 to the data output signal 410 and forces the data output signal 412 to zero. If the ACCESS_MODE signal 304 is at logic level one, the Output Selection Logic 438 routes the signal 436 to the data output signal 412 and forces the data output signal 410 to zero.

Figure 5:
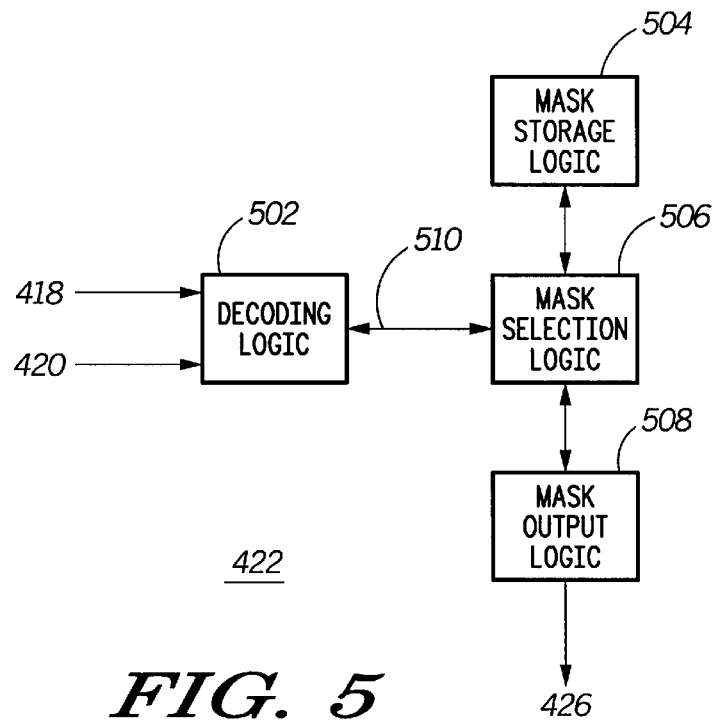
FIG. 5 shows a diagram of a preferred embodiment of the Embedded ROM Logic 422 in accordance with the present invention.

Referring to FIG. 5, Embedded ROM Logic 422 includes Mask Storage Logic 504 for storing hard-coded masks. The Mask Storage Logic 504 includes a separate hard-coded mask for each of a number of memory locations in the EEPROM 210. Embedded ROM Logic 422 also includes Decoding Logic 502 that is operably coupled to receive the chip select signal 418 and the data signal 420. When the chip select signal 418 is asserted, the Decoding Logic 502 decodes the command received on the data signal 420. If the command is for reading a particular memory location in the EEPROM 210, the Decoding Logic 502 activates the Mask Selection Logic 506. The Mask Selection Logic 506 obtains a memory location indicator from the Decoding Logic 502 over the interface 510, and selects a corresponding mask from the Mask Storage Logic 504. The Mask Selection Logic 506 passes the selected mask to Mask Output Logic 508, which outputs the mask on signal 426.

Figure 6:
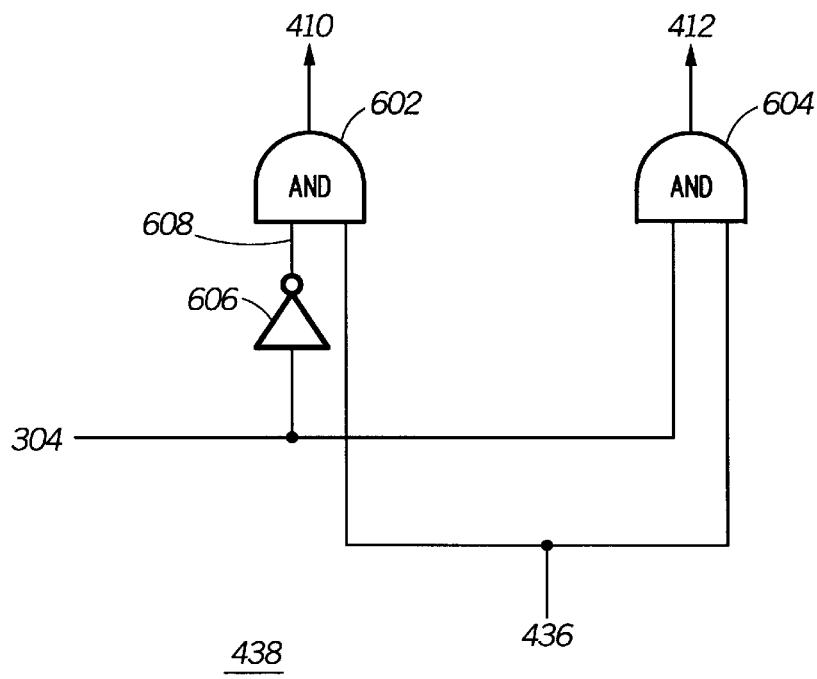
FIG. 6 shows a diagram of a preferred embodiment of the Output Selection Logic 438 in accordance with the present invention.

As shown in FIG. 6, Output Selection Logic 438 is operably coupled to receive the ACCESS_MODE signal 304 from the Registers 204 and the signal 436 from the Multiplexer 434. A first AND Gate 602 controls the data output signal 410 which is routed to the PCI Interface Logic 202. A second AND Gate 604 controls the data output signal 412 which is routed to the Peripheral Specific Logic 206. The first AND Gate 602 is activated when the ACCESS_MODE signal 304 is at logic level zero. Therefore, ACCESS_MODE signal 304 is routed as an input to an Inverter 606 that outputs inverted signal 608. The first AND Gate 602 is operably coupled to receive, as its two inputs, the inverted signal 608 and the signal 436 from the Multiplexer 434. The second AND Gate 604 is activated when the ACCESS_MODE signal 304 is at logic level one. The second AND Gate 604 is operably coupled to receive, as its two inputs, the ACCESS_MODE signal 304 and the signal 436 from the Multiplexer 434. When the ACCESS_MODE signal 304 is at logic level zero, the first AND Gate 602 outputs the signal 436, while the second AND Gate 604 outputs zero. When the ACCESS_MODE signal 304 is at logic level one, the first AND Gate 602 outputs zero, while the second AND Gate 604 outputs the signal 436.

The various mechanisms described with respect to FIGS. 4 and 5 are demonstrated by the following example. We first suppose that a valid default configuration information value corresponding to a particular 16-bit memory location in the EEPROM 210 is equal to 0x342F (where "0x" indicates hexadecimal). The 16-bit memory location in the EEPROM 210 is preset to the all ones value 0xFFFF. The corresponding mask associated with the 16-bit memory location is equal to the bit-wise exclusive-OR of the default configuration information value 0x342F and the preset value in the memory location 0xFFFF, which equals 0xCBD0. Thus, the value 0xCBD0 is programmed into the Embedded ROM Logic 422 and specifically into the Mask Storage Logic 504. When the PCI Interface Logic 202 attempts to read the 16-bit memory location, the value 0xFFFF is obtained from the 16-bit memory location in the EEPROM 210 on signal 428, and the corresponding mask 0xCBD0 is obtained from the Embedded ROM Logic 422 on signal 426. The Bit-Wise Exclusive-OR Logic 424 combines the value 0xFFFF with the corresponding mask 0xCBD0 and outputs the value 0x342F on signal 430.

We now suppose that the default configuration information value 0x342F needs to be modified, for example, to be a new configuration information value 0xAB4. Having established communication with the PCI peripheral using the default value 0x342F, the configuration software (or other software) re-programs the PCI peripheral device by writing a new data value into the 16-bit memory location in the EEPROM 210. The new data value must be such that, when combined with the mask 0xCBD0 using a bit-wise exclusive-OR operation, the new configuration information value 0xAB4 is obtained. Therefore, the new data value is equal to the bit-wise exclusive-OR of the new configuration information value 0xAB4 and the mask 0xCBD0, which equals 0x4164. Thus, the new data value 0x4164 is written into the 16-bit memory location in the EEPROM 210. Now when the PCI Interface Logic 202 attempts to read the 16-bit memory location, the value 0x4164 is obtained from the 16-bit memory location in the EEPROM 210 on signal 428, and the corresponding mask 0xCBD0 is obtained from the Embedded ROM Logic 422 on signal 426. The Bit-Wise Exclusive-OR Logic 424 combines the value 0x4164 with the corresponding mask 0xCBD0 and outputs the value 0xAB4 on signal 430.

The preferred Control Logic 302 shown in FIG. 4 is embodied in a custom-designed Application Specific Integrated Circuit (ASIC) that includes the logic 301 shown in FIG. 3. Numerous alternative embodiments of Control Logic 302 are possible. In one alternative embodiment (not shown), Control Logic 302 is embodied as a program that is stored in a non-volatile memory and used in conjunction with a programmable logic device. The programmable logic device may include, for example, a Field Programmable Gate Array (FPGA) or a microprocessor.

Figure 7:
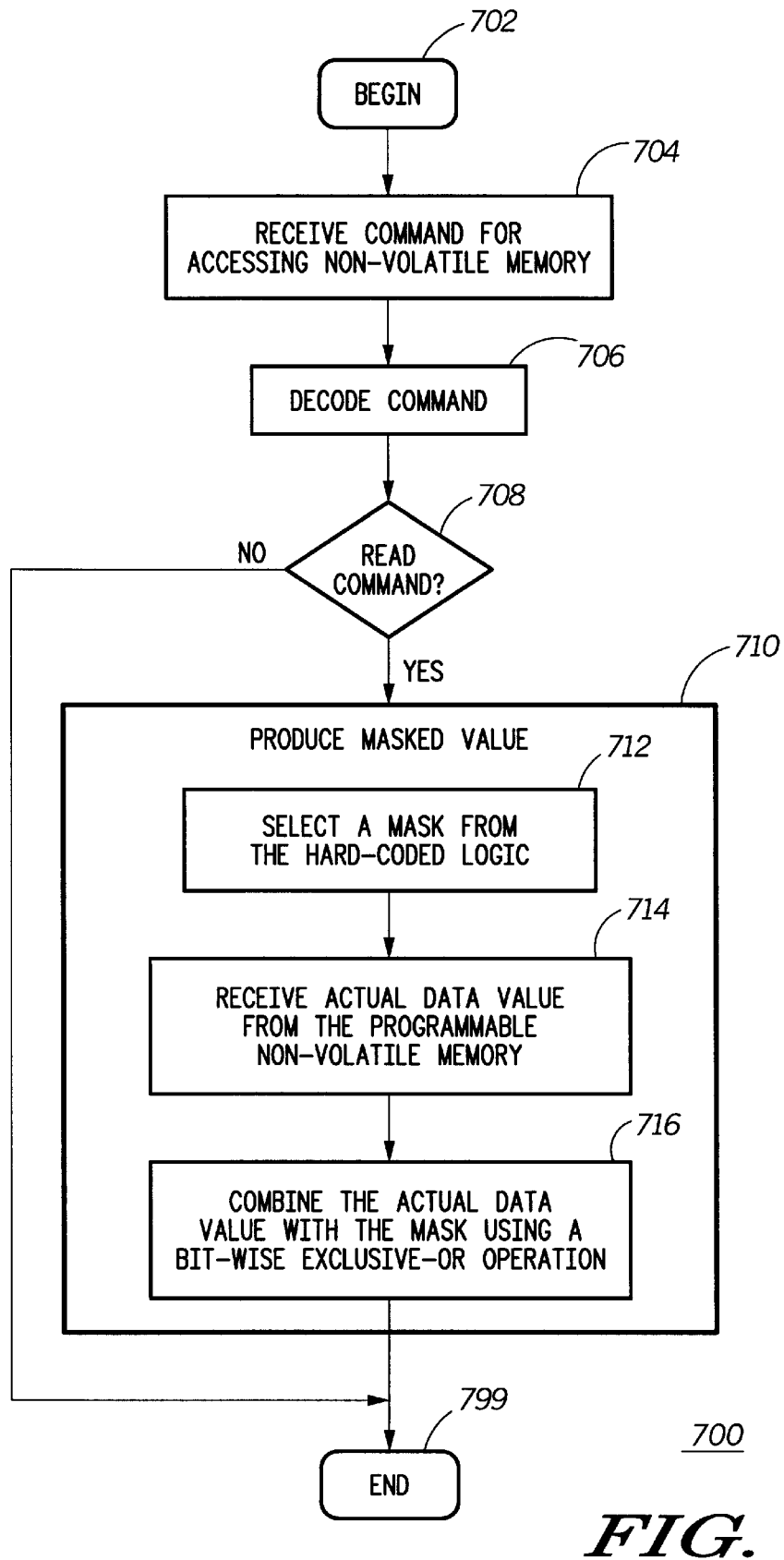
FIG. 7 shows a flow chart of a method for providing configuration information values in a PCI peripheral device in accordance with a preferred embodiment of the present invention.

Thus, the Control Logic 302 can be described generally by means of a series or sequence of steps comprising a method for providing configuration information values in a PCI peripheral device, as shown in FIG. 7. The method 700 begins in step 702, and proceeds to receive a command for accessing the programmable non-volatile memory in step 704. The method decodes the command in step 706, and determines whether or not the command is for reading a particular memory location in the programmable non-volatile memory, in step 708. If the command is for reading a particular memory location (YES in step 708), then the method proceeds to produce a masked value that is equal to a bit-wise exclusive-OR of an actual data value obtained from the programmable non-volatile memory and a corresponding mask from a hard-coded logic. In order to produce the masked value in step 710, the method selects the corresponding mask from the hard-coded logic, in step 712. The method receives the actual data value from the memory, in step 714, and combines the mask with the actual data value using a bit-wise exclusive-OR operation, in step 716. The method terminates in step 799.

As described above, the preferred Control Logic 302 shown in FIG. 4 is configured so that the PCI Interface Logic 202 receives masked values and the Peripheral Specific Logic 206 receives unmasked values. Numerous alternative embodiments of Control Logic 302 are possible. In one alternative embodiment (not shown), Output Selection Logic 438 may be eliminated by routing signal 436 to both data output signals 410 and 412. In yet another alternative embodiment (not shown), both Output Selection Logic 438 and Multiplexer 434 may be eliminated by routing signal 430 to data output signal 410 and routing signal 428 to data output signal 412. Other alternative embodiments will become apparent to the skilled artisan.

The preferred Control Logic 302 shown in FIG. 4 works in conjunction with a serial EEPROM 210 that outputs one bit at a time. Alternative embodiments of the Control Logic 302 may be used with an EEPROM or other programmable non-volatile memory that outputs data in parallel. One alternative embodiment (not shown) includes modified Embedded ROM Logic 422 which outputs the mask in parallel, and also includes modified Bit-Wise Exclusive-OR Logic 424 for receiving signals 426 and 428 in parallel and outputting the resulting masked value serially as signal 430. Other alternative embodiments will become apparent to the skilled artisan.

Figure 8:
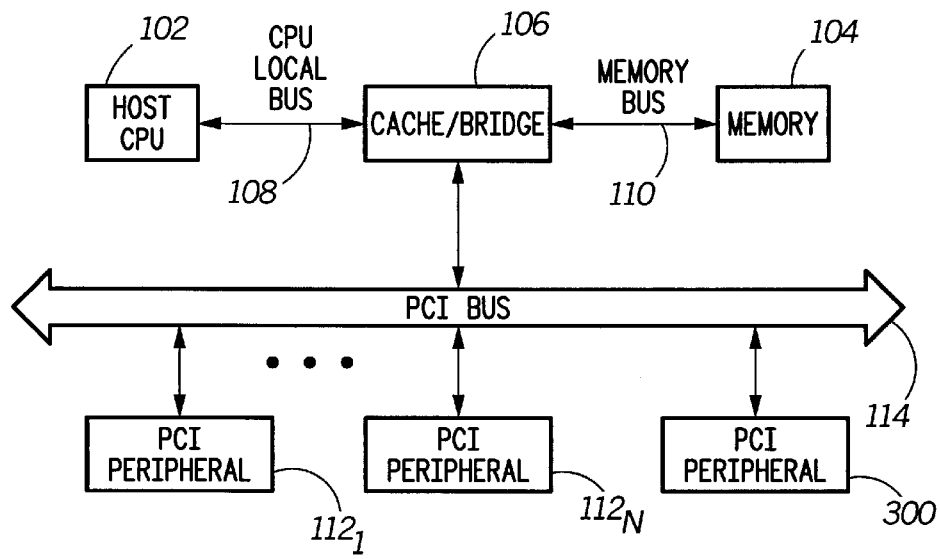
FIG. 8 shows a diagram of a computer system 800 including both prior art PCI Peripherals 112 and a PCI Peripheral 300 in accordance with a preferred embodiment of the present invention.

FIG. 8 shows a computer system 800 including both prior art PCI Peripherals F 112 as well as a PCI Peripheral 300 in accordance with the present invention. PCI Peripheral 300 is typically installed into the computer system 800 without being preprogrammed with configuration information. Control Logic 302, shown in FIG. 3 and described in greater detail in FIG. 4, allows the PCI Peripheral 300 to report default configuration information to the configuration software during computer system startup. Therefore, the PCI Peripheral 300 is able to operate within the computer system 800 even though it is not pre-programmed with configuration information.

Computer system 800 can be described generally as a system having a host device in communication with a peripheral device. In the preferred embodiment, the host device is the Host CPU 102 and the peripheral device is the PCI Peripheral 300. The host device includes means for communicating with the peripheral device, which in the preferred embodiment includes communicating through the Cache/Bridge 106 over the CPU Local Bus 108 and the PCI Bus 114. Alternatively, the host device may include its own PCI interface logic for connecting directly to the PCI bus. Also, because the present invention is not limited to use with PCI peripherals, the host device may communicate with the peripheral device over any of a number of other communication links.

Once the PCI Peripheral 300 is able to operate within the computer system 800, the configuration software (or other software) running on the host device can modify the configuration information in the PCI Peripheral 300. In order to change a particular configuration information value to a new configuration information value, the configuration software (or other software) writes a new data value to the PCI Peripheral 300 which is stored in a corresponding memory location in the EEPROM 210. The new data value is equal to the bit-wise exclusive-OR of the new configuration information value and the corresponding mask. The software uses standard PCI-defined data transfer mechanisms to write the new data value into the memory location.

Figure 9:
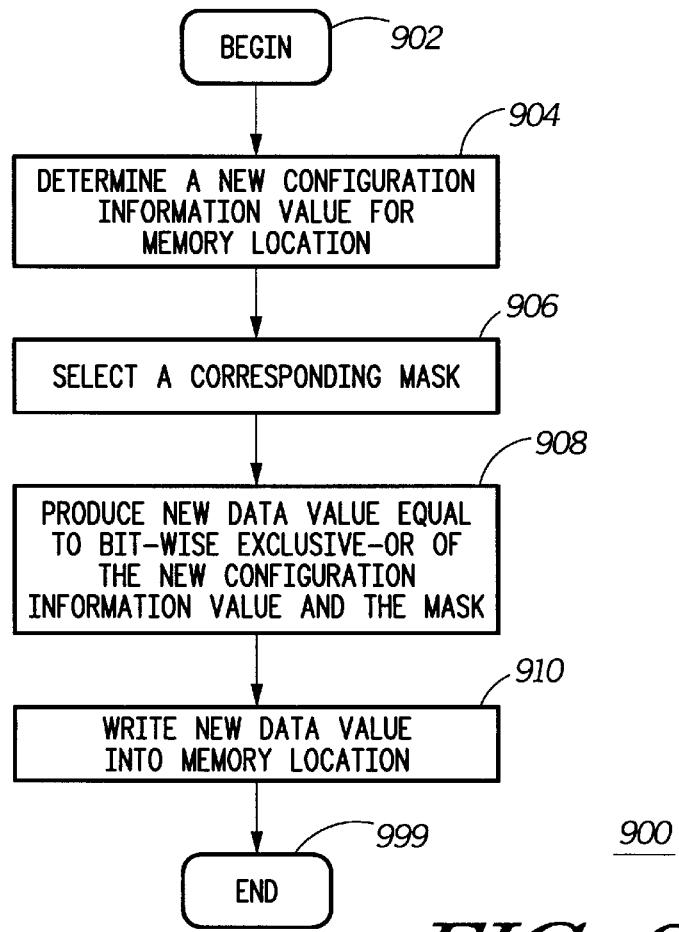
FIG. 9 shows a flow chart of a method for modifying a configuration information value in a PCI peripheral device in accordance with a preferred embodiment of the present invention.

Thus, the configuration software (or other software) performs a series or sequence of steps comprising a method for modifying a particular configuration information value in a PCI peripheral device, as shown in FIG. 9. The method 900 begins in step 902, and proceeds to determine a new configuration information value in step 904. The method selects a corresponding mask, in step 906, and produces a new data value equal to a bit-wise exclusive-OR of the new configuration information value and the corresponding mask, in step 908. The method then writes the new data value into a corresponding memory location in the PCI peripheral device using standard PCI-defined data transfer mechanisms, in step 910. The method terminates in step 999.

All logic described herein can be embodied using discrete components, integrated circuitry, programmable logic used in conjunction with a programmable logic device such as a Field Programmable Gate Array (FPGA) or microprocessor, or any other means including any combination thereof. Programmable logic can be fixed temporarily or permanently in a tangible medium such as a read-only memory chip, a computer memory, a disk, or other storage medium. Programmable logic can also be fixed in a computer data signal embodied in a carrier wave, allowing the programmable logic to be transmitted over an interface such as a computer bus or communication network. All such embodiments are intended to fall within the scope of the present invention.

While the present invention applies specifically to a PCI peripheral device, it will be apparent to the skilled artisan that the present invention can be applied more generally to other applications that need to be programmable but not pre-programmed with default configuration information. All such applications are intended to fall within the scope of the present invention.

The present invention may be embodied in other specific forms without departing from the essence or essential characteristics. The described embodiments are to be considered in all respects only as illustrative and not restrictive.

What is claimed is:

1. In a system for initializing peripheral equipment coupled to a computer, a device for outputting a masked value from data stored in an external memory device, the external memory device having a plurality of memory locations for storing data, the device comprising:

mask storage logic for storing a separate mask for each of the plurality of memory locations; and logic, responsive to a request for reading a memory location, for outputting a masked value equal to a bit-wise exclusive-OR of data stored in the memory location and a corresponding mask from the mask storage logic.

2. The device of claim 1 wherein each mask is equal to a bit-wise exclusive-OR of a predetermined configuration value and a preset value.

3. The device of claim 2 wherein the preset value is equal to an all ones value.

4. The device of claim 1 wherein the logic for outputting the masked value comprises:

receiving logic for receiving the data stored in the memory location;

selecting logic for selecting the corresponding mask from the mask storage logic; and bit-wise exclusive-OR logic, operably coupled to receive the data from the receiving logic and the corresponding mask from the selecting logic, for generating and outputting the masked value.

5. The device of claim 4 wherein the selecting logic comprises:

decoding logic for decoding the request for reading the memory location;

mask selection logic, operably coupled to the decoding logic and to the mask storage logic, for receiving a memory location indicator from the decoding logic and for selecting the corresponding mask from the mask storage logic; and mask output logic, operably coupled to receive the selected mask from the mask selection logic, for outputting the selected mask in synchronization with the data.

6. In a system for initializing peripheral equipment coupled to a computer, a method for outputting a masked value from data stored in an external memory device, the external memory device having a plurality of memory locations for storing data, the method comprising the steps of:

receiving a request for reading a memory location;

receiving the data stored in the memory location from the external memory device;

selecting a corresponding mask from a mask storage logic; and combining the data and the corresponding mask using a bit-wise exclusive-OR operation to produce the masked value.

7. The method of claim 6 wherein the mask is equal to a bit-wise exclusive-OR of a predetermined configuration value and a preset value.

8. The method of claim 7 wherein the preset value is equal to an all ones value.

9. The method of claim 6 wherein the step of selecting the corresponding mask from the mask storage logic comprises the steps of:

decoding the request in order to obtain a memory location indicator therefrom; and selecting the mask based on the memory location indicator.

10. In a system for initializing peripheral equipment coupled to a computer, a apparatus comprising a computer usable medium having computer readable program code means embodied therein for outputting a masked value from data stored in an external memory device, the external memory device having a plurality of memory locations for storing data, the computer readable program code means comprising:

computer readable program code means for storing a separate mask for each of the plurality of memory locations; and computer readable program code means, responsive to a request for reading a memory location, for outputting a masked value equal to a bit-wise exclusive-OR of data stored in the memory location and a corresponding mask from the mask storage logic.

11. The apparatus of claim 10 wherein each mask is equal to a bit-wise exclusiveOR of a predetermined configuration value and a preset value.

12. The apparatus of claim 11 wherein the preset value is equal to an all ones value.

13. The apparatus of claim 10 wherein the computer readable program code means for outputting the masked value comprises:

computer readable program code means for receiving the data stored in the memory location;

computer readable program code means for selecting the corresponding mask from the mask storage logic; and computer readable program code means, operably coupled to receive the data from the receiving logic and the corresponding mask from the selecting logic, for generating and outputting the masked value.

14. The apparatus of claim 13 wherein the computer readable program code means for selecting the corresponding mask from the mask storage logic comprises:

computer readable program code means for decoding the request for reading the memory location;

computer readable program code means, operably coupled to the decoding logic and to the mask storage logic, for receiving a memory location indicator from the decoding logic and for selecting the corresponding mask from the mask storage logic; and computer readable program code means, operably coupled to receive the selected mask from the mask selection logic, for outputting the selected mask in synchronization with the data.

15. In a system for initializing peripheral equipment coupled to a computer, a computer data signal embodied in a carrier wave, wherein embodied in the computer data signal are computer readable program code means for responding during a PCI configuration cycle, the computer readable program code means comprising:

computer readable program code means for storing a separate mask for each of the plurality of memory locations; and computer readable program code means, responsive to a request for reading a memory location, for outputting a masked value equal to a bit-wise exclusive-OR of data stored in the memory location and a corresponding mask from the mask storage logic.

16. The computer data signal of claim 15 wherein each mask is equal to a bit-wise exclusive-OR of a predetermined configuration value and a preset value.

17. The computer data signal of claim 16 wherein the preset value is equal to an all ones value.

18. The computer data signal of claim 15 wherein the computer readable program code means for outputting the masked value comprises:

computer readable program code means for receiving the data stored in the memory location;

computer readable program code means for selecting the corresponding mask from the mask storage logic; and computer readable program code means, operably coupled to receive the data from the receiving logic and the corresponding mask from the selecting logic, for generating and outputting the masked value.

19. The computer data signal of claim 18 wherein the computer readable program code means for selecting the corresponding mask from the mask storage logic comprises:

computer readable program code means for decoding the request for reading the memory location;

computer readable program code means, operably coupled to the decoding logic and to the mask storage logic, for receiving a memory location indicator from the decoding logic and for selecting the corresponding mask from the mask storage logic; and computer readable program code means, operably coupled to receive the selected mask from the mask selection logic, for outputting the selected mask in synchronization with the data.

20. In a system for initializing peripheral equipment coupled to a computer, a device for outputting configuration information as part of a computer startup sequence, the device comprising:

a memory device having a plurality of memory locations for storing data;

mask storage logic for storing a separate mask for each of the plurality of memory locations; and logic, responsive to a request for reading a memory location, for outputting a masked value equal to a bit-wise exclusive-OR of data stored in the memory location and a corresponding mask from the mask storage logic.

21. The device of claim 20 wherein each mask is equal to a bit-wise exclusive-OR of a predetermined configuration value and a preset value.

22. The device of claim 21 wherein the preset value is equal to an all ones value.

23. The device of claim 20 wherein the logic for outputting the masked value comprises:

receiving logic for receiving the data stored in the memory location;

selecting logic for selecting the corresponding mask from the mask storage logic; and bit-wise exclusive-OR logic, operably coupled to receive the data from the receiving logic and the corresponding mask from the selecting logic, for generating and outputting the masked value.

24. The device of claim 23 wherein the selecting logic comprises:

decoding logic for decoding the request in order to obtain a memory location indicator therefrom;

mask selection logic, operably coupled to the decoding logic and to the mask storage logic, for receiving the memory location indicator from the decoding logic and for selecting the corresponding mask from the mask storage logic; and mask output logic, operably coupled to receive the selected mask from the mask selection logic, for outputting the selected mask in synchronization with the data.

25. The device of claim 20 further comprising:

peripheral component interconnect (PCI) interface logic, operably coupled to receive the masked value, for interfacing the device to a PCI bus; and peripheral specific logic, operably coupled to receive the data from the receiving logic, for implementing specific device functions.

26. The device of claim 25 wherein the specific device functions include modem interface functions.

27. In a system for initializing peripheral equipment coupled to a computer, a device for modifying configuration information stored in a memory, the memory having a plurality of memory locations, each memory location having a corresponding mask, the device comprising:

logic for determining a new configuration information value for a memory location;

logic for generating a new data value equal to a bit-wise exclusive-OR of the new configuration information value and the corresponding mask; and logic for storing the new data value in the memory location.

28. The device of claim 27 wherein the logic for storing the new data value in the memory location comprises:

means for sending the new data value to the memory over a peripheral component interconnect (PCI) interface bus.

29. In a system for initializing peripheral equipment coupled to a computer, a method of modifying configuration information stored in a memory, the method comprising the steps of:

determining a new configuration information value for a memory location in a memory;

generating a new data value equal to a bit-wise exclusive-OR of the new configuration information value and a corresponding mask; and storing the new data value in the memory location in the memory.

30. The method of claim 29 wherein the step of storing the new data value in the memory location comprises sending the new data value to the memory over a peripheral component interconnect (PCI) bus.

31. In a system for initializing peripheral equipment coupled to a computer, an apparatus comprising a computer usable medium having computer readable program code means embodied therein for modifying configuration information stored in a memory, the computer readable program code means comprising:

computer readable program code means for determining a new configuration information value for a memory location in a memory;

computer readable program code means for generating a new data value equal to a bit-wise exclusive-OR of the new configuration information value and a corresponding mask; and computer readable program code means for storing the new data value in the memory location in the memory.

32. The apparatus of claim 31 wherein the computer readable program code means for storing the new data value in the memory location comprises computer readable program code means for sending the new data value to the memory over a peripheral component interconnect (PCI) bus.

33. In a system for initializing peripheral equipment coupled to a computer, a computer data signal embodied in a carrier wave, wherein embodied in the computer data signal are computer readable program code means for responding during a PCI configuration cycle, the computer readable program code means comprising:

computer readable program code means for determining a new configuration information value for a memory location;

computer readable program code means for generating a new data value equal to a bit-wise exclusive-OR of the new configuration information value and the corresponding mask; and computer readable program code means for storing the new data value in the memory location.

34. The computer data signal of claim 33 wherein the computer readable program code means for storing the new data value in the memory location comprises computer readable program code means for sending the new data value to the memory over a peripheral component interconnect (PCI) bus.

35. In a system for initializing peripheral equipment coupled to a computer, a system comprising:

a host device including logic for sending a request to a peripheral device for reading a memory location; and the peripheral device including:

a memory device having a plurality of memory locations for storing data;

mask storage logic for storing a separate mask for each of the plurality of memory locations; and logic, responsive to the request for reading the memory location, for sending a masked value to the host device, wherein the masked value is equal to a bit-wise exclusive-OR of data stored in the memory location and a corresponding mask from the mask storage logic.

36. The system of claim 35 wherein:

the host device communicates with the peripheral device by means of a Peripheral Component Interconnect (PCI) bus;

the host device further includes means for sending the request to the peripheral device over the PCI bus and for receiving the masked value from the peripheral device over the PCI bus; and the peripheral device further includes PCI interface logic, operably coupled to the PCI bus, for receiving the request from the host device and for sending the masked value to the host device.

37. The system of claim 35 wherein each mask is equal to a bit-wise exclusive-OR of a predetermined configuration value and a preset value.

38. The system of claim 37 wherein the preset value is equal to an all ones value.

39. The system of claim 35 wherein the logic for sending the masked value to the host device comprises:

receiving logic for receiving the data stored in the memory location;

selecting logic for selecting the corresponding mask from the mask storage logic; and bit-wise exclusive-OR logic, operably coupled to receive the data from the receiving logic and the corresponding mask from the selecting logic, for generating and outputting the masked value.

40. The system of claim 39 wherein the selecting logic comprises:

decoding logic for decoding the request in order to obtain a memory location indicator therefrom;

mask selection logic, operably coupled to the decoding logic and to the mask storage logic, for receiving the memory location indicator from the decoding logic and for selecting the corresponding mask from the mask storage logic; and mask output logic, operably coupled to receive the selected mask from the mask selection logic, for outputting the selected mask in synchronization with the data.

41. The system of claim 35 wherein the peripheral device further comprises:

peripheral specific logic, operably coupled to receive the data from the receiving logic, for implementing specific device functions.

42. The system of claim 41 wherein the specific device functions include modem interface functions.

43. The system of claim 35 wherein the host device further includes:

logic for determining a new configuration information value for the memory location;

logic for generating a new data value equal to a bit-wise exclusive-OR of the new configuration information value and the corresponding mask; and logic for storing the new data value in the memory location.

44. The system of claim 43 wherein the logic for storing the new data value in the memory location comprises means for sending the new data value to the peripheral device.

45. A method for initializing peripheral equipment coupled via a bus to a host computer, the peripheral equipment having an empty rewritable memory device, a controller and a mask within the controller having a default identification, comprising the steps of:

at the host computer, transmitting initialization data looking for a peripheral device over the bus;

at the peripheral device, exclusively-ORing the mask with the output of the empty memory device to provide a default identification;

transmitting the default identification back to the host computer over the bus; and, at the host computer, either accepting the default identification or transmitting back over the bus a new mask such that the memory device is programmed with this mask, whereby the next time the peripheral device is initialized, the peripheral device transmits back the desired identification.

46. The method of claim 45, wherein the exclusive-ORing is accomplished on a bit by bit basis.

* * * * *

UNITED STATES PATENT AND TRADEMARK OFFICE
CERTIFICATE OF CORRECTION

PATENT NO.   : 6,167,472
DATED        : December 26, 2000
INVENTOR(S)  : Rajat K. Mitra et al.

It is certified that error appears in the above-identified patent and that said Letters Patent is hereby corrected as shown below:

<u>Title page,</u>
Item [73], add the following -- Atmel Corporation, San Jose, CA --

Signed and Sealed this

Fifth Day of November, 2002

*Attest:*

*Attesting Officer*

JAMES E. ROGAN
*Director of the United States Patent and Trademark Office*